(12) United States Patent
Lahiano et al.

(10) Patent No.: US 12,244,564 B2
(45) Date of Patent: Mar. 4, 2025

(54) SECURITY FOR COMPUTER SYSTEMS

(71) Applicant: Microsoft Technology Licensing, LLC, Redmond, WA (US)

(72) Inventors: Daniel Lahiano, Petah Tikva (IL); Vladimir Perelman, Tel Aviv (IL); Orr Moran, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 68 days.

(21) Appl. No.: 17/816,381

(22) Filed: Jul. 29, 2022

(65) Prior Publication Data

US 2024/0039892 A1 Feb. 1, 2024

(51) Int. Cl.
| H04L 9/40 | (2022.01) |
| G06F 16/17 | (2019.01) |
| G06F 21/62 | (2013.01) |

(52) U.S. Cl.
CPC ...... *H04L 63/0254* (2013.01); *G06F 16/1734* (2019.01); *G06F 21/6218* (2013.01)

(58) Field of Classification Search
CPC ............. H04L 63/0254; H04L 63/0227; H04L 63/105; G06F 16/1734; G06F 21/6218
See application file for complete search history.

(56) References Cited

U.S. PATENT DOCUMENTS

| 5,564,017 | A | | 10/1996 | Corn |
| 5,937,159 | A | * | 8/1999 | Meyers ................ G06F 21/31 726/20 |
| 7,904,447 | B1 | | 3/2011 | Russell |
| 8,225,385 | B2 | | 7/2012 | Chow et al. |
| 8,544,073 | B2 | | 9/2013 | Walter Silhavy |
| 8,695,090 | B2 | | 4/2014 | Barile et al. |
| 9,047,476 | B2 | | 6/2015 | Chawla et al. |
| 9,384,359 | B2 | | 7/2016 | Jacobson et al. |

(Continued)

FOREIGN PATENT DOCUMENTS

| CN | 111343132 A | | 6/2020 |
| JP | 2009026022 A | * | 2/2009 |
| KR | 100976602 B1 | | 8/2010 |

OTHER PUBLICATIONS

"International Search Report and Written Opinion Issued in PCT Application No. PCT/US20023/23040", Mailed Date: Aug. 18, 2023, 14 Pages.

(Continued)

*Primary Examiner* — Anh Nguyen
(74) *Attorney, Agent, or Firm* — Barta Jones, PLLC

(57) ABSTRACT

Filesystem driver software can receive a file access request indicating that an application process is requesting to access a target file in a filesystem, Network filter driver software can receive a connection establishment request indicating that the application process running on the processing apparatus is requesting to establish a connection over a network with a target endpoint. According to the present disclosure, one or both of: a) the filesystem driver software is configured to grant or deny the file access request in dependence on state information from the network filter driver software, and/or b) the network filter driver software is configured to grant or deny the connection establishment request in dependence on state information from the filesystem driver software.

20 Claims, 5 Drawing Sheets

(56) References Cited

U.S. PATENT DOCUMENTS

| | | | |
|---|---|---|---|
| 10,484,372 | B1 | 11/2019 | Johansson et al. |
| 11,082,444 | B2 | 8/2021 | Macleod et al. |
| 11,134,104 | B2 | 9/2021 | Qureshi et al. |
| 2006/0288008 | A1 | 12/2006 | Bhattiprolu |
| 2008/0263653 | A1 | 10/2008 | Lee |
| 2012/0163180 | A1 | 6/2012 | Goel et al. |
| 2014/0223513 | A1 | 8/2014 | Islam |
| 2015/0095597 | A1 | 4/2015 | Ayanam et al. |
| 2016/0212113 | A1 | 7/2016 | Banerjee |
| 2017/0091482 | A1 | 3/2017 | Sarin et al. |
| 2017/0364707 | A1* | 12/2017 | Lal .................. G06F 21/57 |
| 2018/0336334 | A1 | 11/2018 | Yadav et al. |
| 2019/0349357 | A1 | 11/2019 | Shukla et al. |
| 2020/0074097 | A1* | 3/2020 | Hamlin ............ G06F 21/575 |
| 2021/0311641 | A1 | 10/2021 | Prakashaiah et al. |
| 2021/0312077 | A1 | 10/2021 | Jain et al. |
| 2021/0344602 | A1 | 11/2021 | Lewin et al. |
| 2023/0336465 | A1 | 10/2023 | Lewin et al. |
| 2023/0421608 | A1 | 12/2023 | Moran |

OTHER PUBLICATIONS

"International Search Report and Written Opinion Issued in PCT Application No. PCT/US2023/015150", Mailed Date: Jun. 16, 2023, 15 Pages.

"Notice of Allowance Issued in U.S. Appl. No. 17/720,133", Mailed Date: Jun. 5, 2023, 9 Pages.

"International Search Report and Written Opinion Issued in PCT Application No. PCT/US2023/023309", Mailed Date: Sep. 15, 2023, 15 Pages.

"Get-SmbConnection", Retrieved from: https://docs.microsoft.com/en-us/powershell/module/smbshare/get-smbconnection?view-windowsserver2022-ps, Retrieved On: Aug. 21, 2022, 3 Pages.

Vice, et al., "Overview: VPN Split Tunneling for Microsoft 365", Retrieved from: https://docs.microsoft.com/en-us/microsoft-365/enterprise/microsoft-365-vpn-split-tunnel?view=o365-worldwide, Mar. 4, 2022, 12 Pages.

"Border Gateway Protocol", Retrieved from: https://en.wikipedia.org/wiki/Border_Gateway_Protocol, Mar. 24, 2022, 18 Pages.

"Check Point: Route-Based", Retrieved from: https://web.archive.org/web/20220324200852/https://docs.oracle.com/en-us/iaas/Content/Network/Reference/checkpointCPEroutebased.htm, Mar. 24, 2022, 8 Pages.

"Introduction—Valtix Documentation", Retrieved from: https://docs.valtix.com/aws/aws_workshop/introduction/, Retrieved from: Apr. 21, 2022, 2 Pages.

"Meraki SD-WAN", Retrieved from: https://documentation.meraki.com/Architectures_and_Best_Practices/Cisco_Meraki_Best_Practice_Design/Best_Practice_Design_-_MX_Security_and_SD-WAN/Meraki_SD-WAN, Mar. 28, 2022, 34 Pages.

"MX Addressing and VLANs", Retrieved from: https://documentation.meraki.com/MX/Networks_and_Routing/MX_Addressing_and_VLANs, Jun. 17, 2021, 4 Pages.

"Networks and Tunnel Routing", Retrieved from: https://cloud.google.com/network-connectivity/docs/vpn/concepts/choosing-networks-routing, Retrieved on: Apr. 21, 2022, 9 Pages.

"Secure Application Workloads with Palo Alto Networks VM-Series Firewall", Retrieved from: https://docs.oracle.com/en/solutions/secure-app-palo-alto-firewall/index.html#GUID-CB6D7F26-0DEA-4B27-A265-E6169D8992E9, Retrieved on: Apr. 21, 2022, 15 Pages.

"Site-to-Site VPN Overview", Retrieved from: https://web.archive.org/web/20220120084208/https://docs.oracle.com/en-us/iaas/Content/Network/Tasks/overviewIPsec.htm, Jan. 20, 2022, 9 Pages.

"Traffic Management", Retreieved from: https://web.archive.org/web/20220301215855/https://istio.io/latest/docs/concepts/traffic-management/, Mar. 1, 2022, 16 Pages.

"What is a Network Load Balancer?", Retrieved from: https://web.archive.org/web/20201214113601/https://docs.aws.amazon.com/elasticloadbalancing/latest/network/introduction.html, Dec. 14, 2020, 3 Pages.

"What is an Application Load Balancer?", Retrieved from: https://web.archive.org/web/20201213163849/https://docs.aws.amazon.com/elasticloadbalancing/latest/application/introduction.html, Dec. 13, 2020, 4 Pages.

Bender, et al., "Virtual Network Traffic Routing", Retrieved from: https://docs.microsoft.com/en-us/azure/virtual-network/virtual-networks-udr-overview#custom-routes, Apr. 16, 2022, 19 Pages.

Keil, Matt, "Threat and Data-Theft Prevention Policies with VM-Series", Retrieved from: https://cloud.google.com/architecture/partners/threat-and-data-theft-prevention-policies-with-vm-series#protecting_apps_from_inbound_threats_and_outbound_data_theft, Jan. 23, 2019, 9 Pages.

Majumder, et al., "Dynamic Routing", Retrieved from: https://docs.citrix.com/en-us/citrix-sd-wan/current-release/routing/dynamic-routing.html, Jul. 28, 2021, 9 Pages.

Majumder, et al., "Zscaler Integration by using GRE Tunnels and IPsec Tunnels", Retrieved from: https://docs.citrix.com/en-us/citrix-sd-wan/current-release/security/citrix-sd-wan-secure-web-gateway/sd-wan-web-secure-gateway-using-gre-tunnels-and-ipsec-tunnels.html, Jun. 9, 2021, 10 Pages.

Panni, Jess, "AWS vs Azure vs Google Cloud Platform—Networking", Retrieved from: https://endjin.com/blog/2016/11/aws-vs-azure-vs-google-cloud-platform-networking, Nov. 14, 2016, 18 Pages.

Patel, Ashish, "Azure—Difference between Azure ExpressRoute and Azure VPN Gateway", Retrieved from: https://medium.com/awesome-azure/azure-difference-between-azure-expressroute-and-azure-vpn-gateway-comparison-azure-hybrid-connectivity-57ce02044f3, Sep. 6, 2021, 6 Pages.

Patel, Ashish, "Azure—Difference between Azure Load Balancer and Application Gateway", Retrieved from: https://medium.com/awesome-azure/azure-difference-between-azure-load-balancer-and-application-gateway-9a6019c23840, Jul. 1, 2020, 5 Pages.

Vaidyanathan, et al., "Network Transformation with AWS and Valtix for Workload Segmentation and Compliance", Retrieved from: https://aws.amazon.com/blogs/apn/network-transformation-with-aws-and-valtix-for-workload-segmentation-and-compliance/, Nov. 22, 2021, 8 Pages.

Vice, et al., "Implementing VPN Split Tunneling for Microsoft 365", Retrieved from: https://docs.microsoft.com/en-us/microsoft-365/enterprise/microsoft-365-vpn-implement-split-tunnel?view=o365-worldwide#common-vpn-scenarios, Mar. 4, 2022, 8 Pages.

Non-Final Office Action mailed on Apr. 25, 2024, in U.S. Appl. No. 17/847,117, 10 pages.

Final Office Action issued in U.S. Appl. No. 17/847,117, mailed on Sep. 10, 2024, 9 Pages.

Notice of Allowance issued in U.S. Appl. No. 17/847,117, mailed on Jan. 6, 2025, 06 Pages.

* cited by examiner

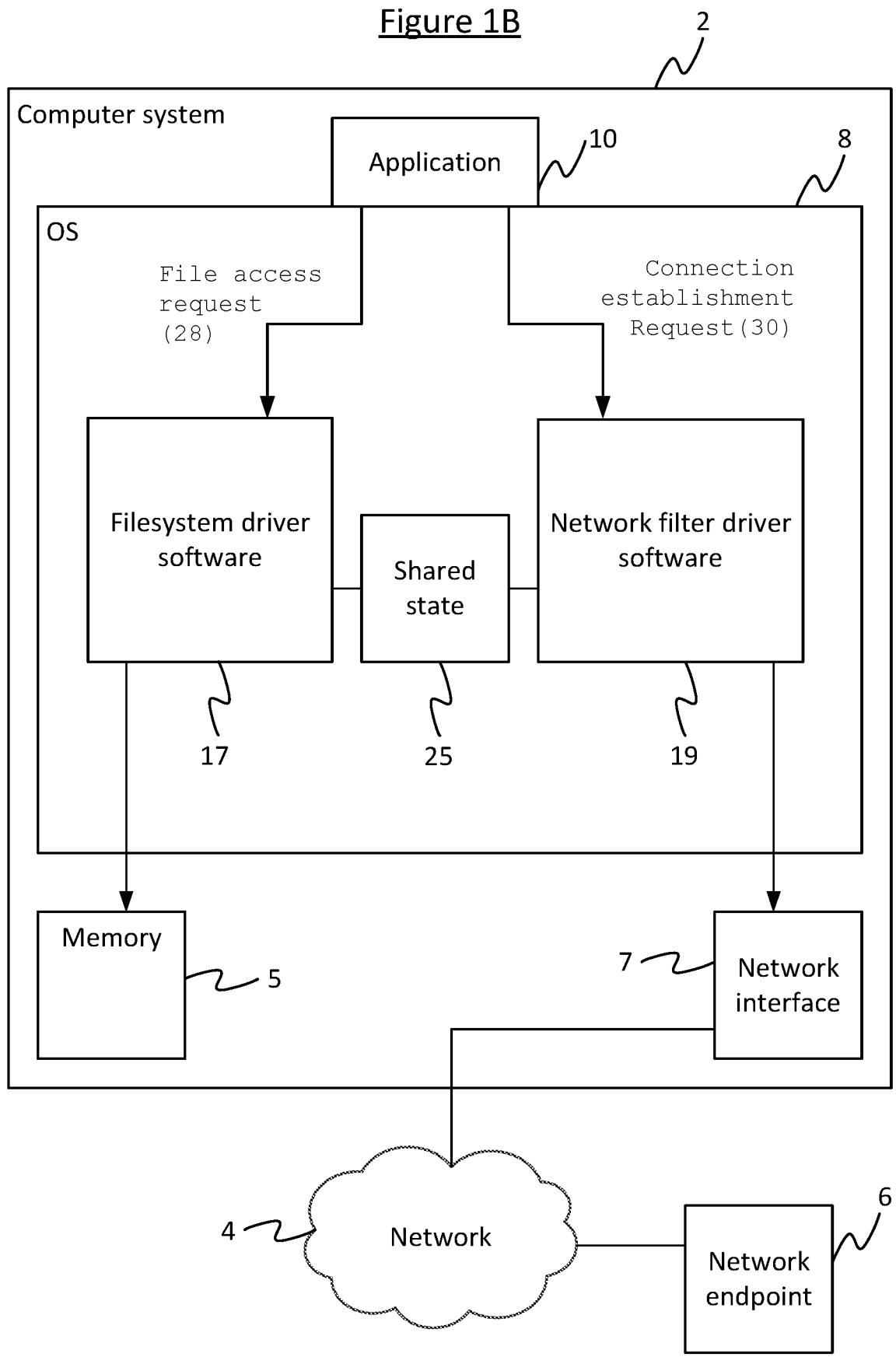

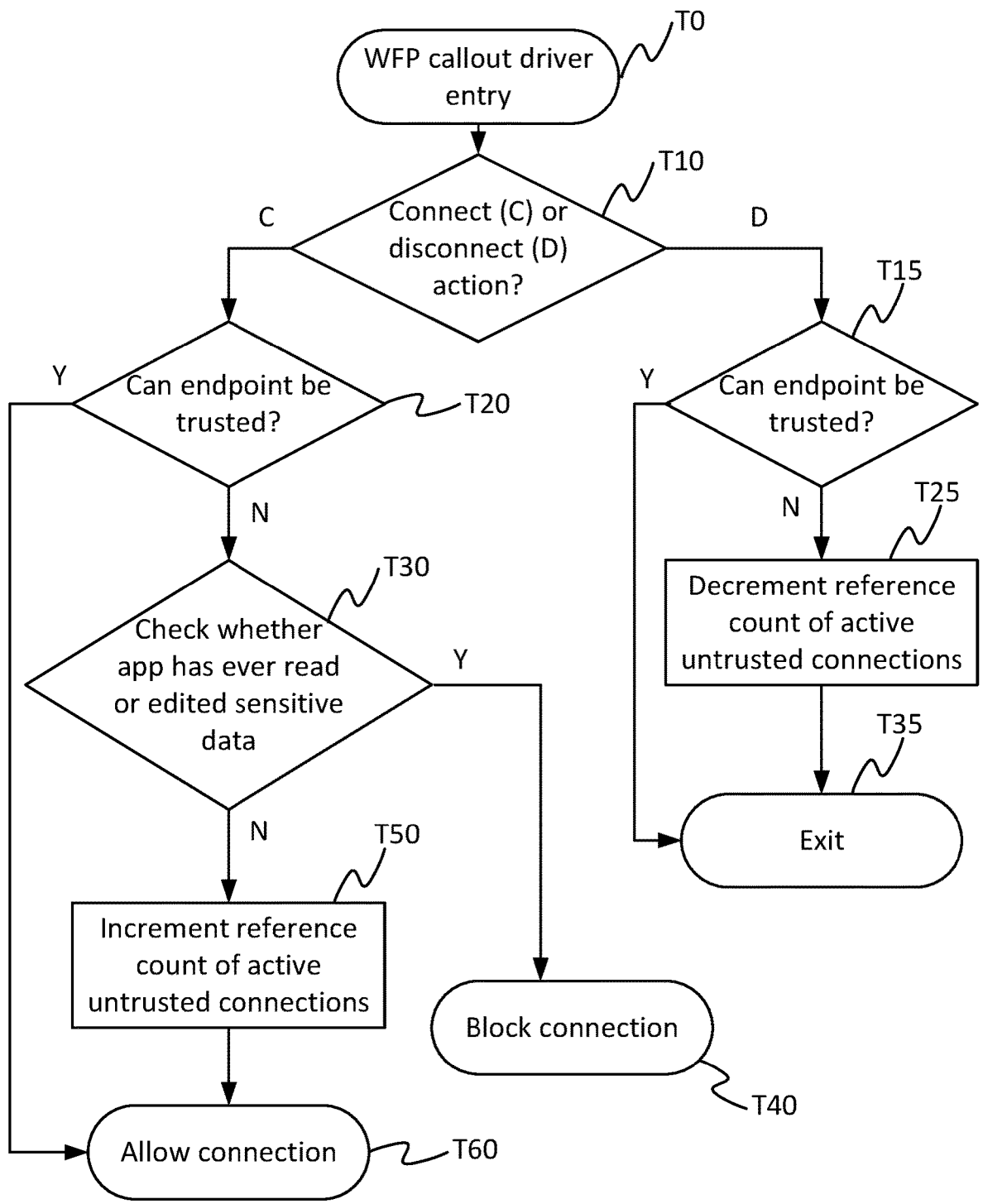

SECURITY FOR COMPUTER SYSTEMS

BACKGROUND

Security is an ongoing concern for users and designers of computer systems such as servers, desktop computers, laptop computers, tablets, smart phones and wearable devices, etc.

It is known for a network filter (sometimes also called the "firewall") of a computer system to check whether an endpoint is trusted when attempting to establish a connection with the endpoint over a network such as the Internet. If the endpoint is found to be untrusted, the connection to the endpoint may be blocked from being formed.

SUMMARY

Access to files in a filesystem of a computer system may also be restricted, or files may be designated as sensitive. However, some applications, such as a word processing application or web browser, may require access to both the filesystem and the network in order to operate.

In existing operating systems, currently the drivers that deal with accessing the filesystem are not provided with any means to communicate with the drivers that handle network access, nor vice versa. E.g. existing firewalls simply either completely block or allow a connection based on the endpoint itself, and do not take into account what files an application has opened.

It is recognized herein that it would be desirable to make the access to a file dependent on state information from the driver software that handles network connections, and/or to make the connection to an endpoint dependent on state information from the driver software that handles filesystem access.

According to one aspect disclosed herein, there is provided a computer system comprising: processing apparatus comprising one or more processors, memory comprising one or more memory devices, and a network interface comprising one or more interface devices. The memory stores operating system software arranged to run on the processing apparatus, the operating system software comprising filesystem driver software and network filter driver software. The filesystem driver software is configured to receive a file access request indicating that an application process running on the processing apparatus is requesting to access a target file in a filesystem of the memory of the computer system. The network filter driver software is configured to receive a connection establishment request indicating that the application process running on the processing apparatus is requesting to establish a connection over a network with a target endpoint via the network interface of the computer system. The operating system is configured such that either or both of: a) the filesystem driver software being configured to grant or deny the file access request in dependence on state information from the network filter driver software, and/or b) the network filter driver software being configured to grant or deny the connection establishment request in dependence on state information from the filesystem driver software.

In other words, the filesystem driver software is configured to make a decision granting or denying the file access request, and/or the network filter driver software is configured to make a decision granting or denying the connection establishment request; and the decision of at least one of the filesystem driver and network filter driver is made dependent state information from the other.

The disclosed system thus allows for more flexibility in determining how to restrict file access and/or network access, compared to other solutions such as firewalls with simply either completely allow or deny network access. For instance, handling sensitive data in applications such as word processing applications or web browsers may lead to sensitive data exposure either unintentionally by the user, or intentionally by a malicious application. On the other hand, it would be desirable to enable applications more freedom to access the network while handling non-sensitive data.

In embodiments, the filesystem driver software may be configured to determine whether the target file is sensitive, and the state information from the network filter driver software may comprise an indication of whether any untrusted network connections are currently active via the network interface. In such embodiments, the file system software being configured to perform a) according to a rule that if the target file is sensitive then the file access request will be granted on condition that the state information from the network filter driver software indicates no active connections to an untrusted endpoint.

Alternatively or additionally, the network filter driver software may be configured to determine whether the target endpoint is trusted, and the state information from the filesystem driver software may comprises an indication of whether the application process has ever read from or written to a sensitive file. In such embodiments the network filter driver software may be configured to perform b) according to a rule that if the target connection is untrusted, the connection establishment request will be granted only on condition that the state information from the filesystem driver software indicates that the application process has never read from or written to a sensitive file, but otherwise the file access request will be denied.

Regarding this implementation of rule b), it is noted herein that even after an application has closed a file, a residual copy of some data from that file may still reside in temporary memory to which the application has access, such as cache or a region of RAM allocated to that application. Therefore it is recognized herein that it would be desirable to block connections to untrusted endpoints requested by an application process not just if the process currently has a sensitive file open, but also if the current process has ever had access to data of a sensitive file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 1B is a schematic block diagram of a computer system in accordance with the present disclosure, FIG. 3 is a schematic flow chart of a method that may be performed by network filter driver software in accordance with embodiments disclosed herein.

DETAILED DESCRIPTION OF EMBODIMENTS

Figure 1A:
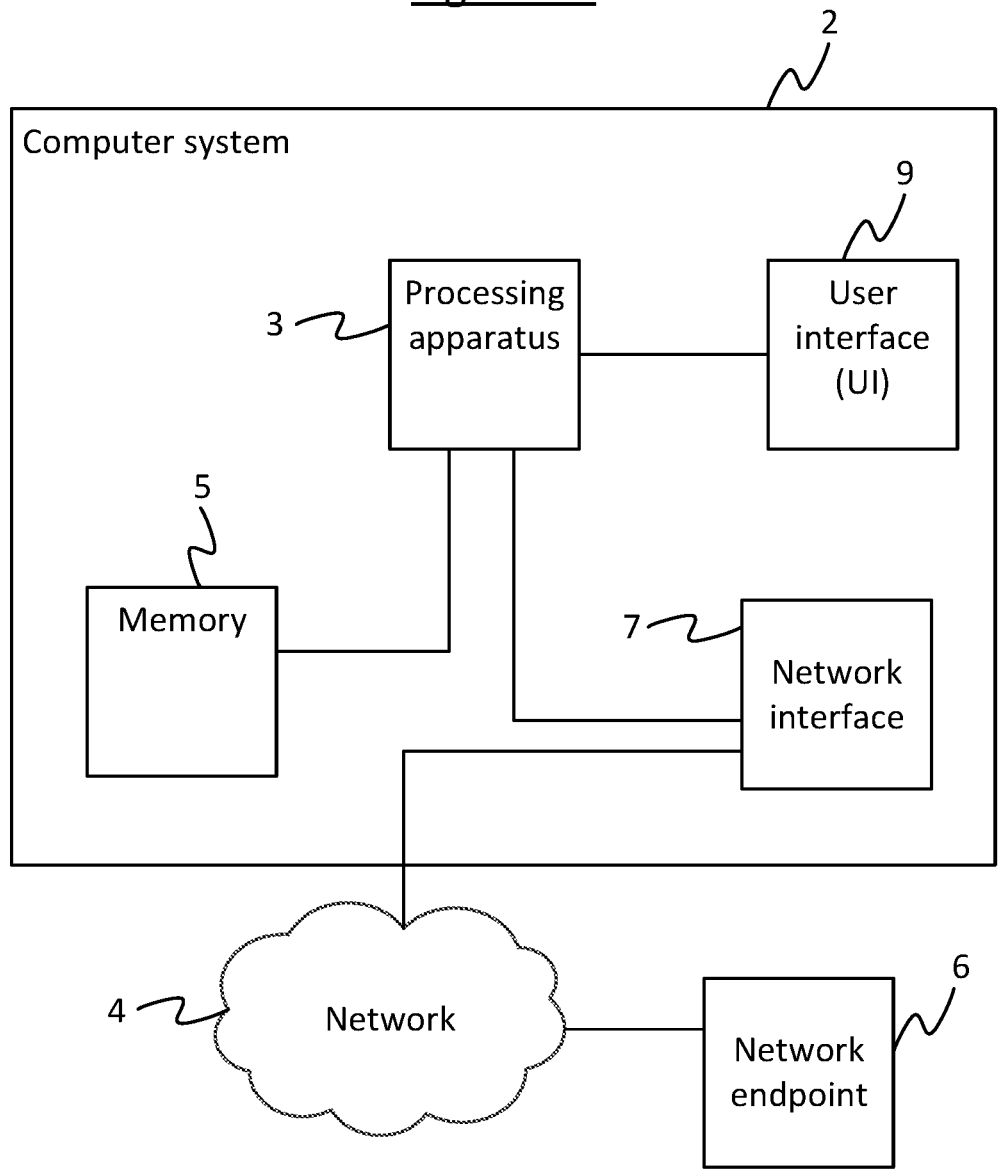
FIG. 1A is a schematic block diagram showing physical components of a computer system.

A network filter (or so-called "firewall") of a computer system can check whether an endpoint is trusted when attempting to establish a connection with the endpoint over a network such as the Internet or a local network. E.g. the endpoint could be a URL of a website that the computer system is trying to connect to over the Internet, another computer with which the computer is trying to communicate over the network, or a peripheral on a home network or other local network. Checking the status of the endpoint as being trusted may comprise, for example, authenticating the endpoint using cryptographic means (e.g. authenticating a certificate or signature of the endpoint), and/or checking that an address (e.g. URL) or other identifier of the endpoint is found on a list of trusted endpoints or not found on a list of untrusted endpoints, and/or checking for malicious data fingerprints (e.g. a fingerprint of a known virus or other malware) in data received from the endpoint. If the endpoint is found to be untrusted, the connection to the endpoint may be blocked from being formed, or alternatively the connection may not necessarily be blocked but the user may be provided with a warning through a user interface (UI) of the computer system. The UI may also prompt the user with a manual option as to whether to block the connection or go ahead with establishing the connection (after all, being untrusted does not necessarily mean the endpoint is malicious, just that it has not passed a check to demonstrate that it is not malicious).

Files in a filesystem of a computer system may also designated as sensitive (e.g. confidential, classified, or top secret, etc.), either having been manually designated as such, or perhaps automatically designated as sensitive according to some rule implemented by the computer system. If access to a file is requested by the user or system in order to perform some operation such as reading or modifying the file, then if the file is also designated sensitive, the UI may prompt the user with a message informing them of the sensitive nature of the file, and/or access to the file may be automatically blocked or granted according to an access policy implemented by the computer system, e.g. depending on the credentials of the application or user requesting access.

Some applications may require access to both the filesystem and the network in order to operate—for instance a word processing application may require access to the filesystem in order to read and edit documents, but may also require access to the network to function properly (e.g. to obtain updates or backup files to the cloud). Another example is a web browser which requires both network and filesystem access.

In existing operating systems, currently the drivers that deal with accessing the filesystem are not provided with any means to communicate with the drivers that handle network access, nor vice versa. E.g. existing solutions such as firewalls for arbitrating connections to network endpoints simply either completely block or allow a connection, but do not take into account what files an application has open at the time or has opened in the past.

It is recognized herein that it would be desirable to make the access to a file dependent on state information from the driver software that handles network connections, and/or to make the connection to an endpoint dependent on state information from the driver software that handles filesystem access. This will allow for more flexible or intelligent decisions as to when to restrict access to files and/or connections to network endpoints access, compared to other solutions such as firewalls with simply either completely allow or deny network access. For instance, handling sensitive data in applications such as word processing applications or web browsers may lead to sensitive data exposure either unintentionally by the user, or intentionally by a malicious application. On the other hand, it would be desirable to enable applications more freedom to access the network while handling non-sensitive data.

Accordingly, the present disclosure provides a method whereby a filesystem driver shares state information with a network filter driver such that file access can be made dependent on a state of the network filter driver, and/or network connections can be made dependent on a state of the filesystem driver. For instance this may be used to provide dynamic network access restriction while handling sensitive data. In embodiments, to provide a generic solution, it is not assumed that there is a fixed order of network access and filesystem access.

An example implementation employs the following components:

I. a filesystem minifilter driver as a filesystem driver,
II. a WFP callout driver as a network filter driver,
III. a method to determine a file's sensitivity, and
IV. a method to determine whether a remote endpoint can be trusted with sensitive data.

In embodiments, a state is maintained for each application process. The state will hold two items—whether the application has ever accessed sensitive data (read or edited a sensitive file), and the amount of active connections to an untrusted endpoints. Using this state and modifications to the filesystem driver software and network filter driver software (e.g. the aforementioned components), either network access or filesystem access may be blocked or allowed according to either or both of the following rules.

a) If an application wants to open a sensitive file, it mustn't have any active connections to an untrusted endpoint.
b) An application can open a connection to an untrusted endpoint only if it has never read or edited a sensitive file.

In embodiments the WPF callout driver and filesystem minifilter driver will perform the actions described in FIGS. 2 and 3, to be discussed in more detail later.

FIG. 1A illustrates physical components of a computer system 2 in which the schemes herein can be implemented. The computer system 2 is shown in context of a wider communication system comprising a network 4 and a network endpoint 6. The computer system 2 may be formed of one or more computer units—either an individual computer unit within a single housing, or a plurality of computer units if different housings networked together via any suitable networking technology, e.g. a wide area network or internetwork such as the Internet, or a local wired or wireless network such as an Ethernet network or Wi-Fi network etc., or a server fabric, etc. Any individual computer terminal of which the computer system 2 is formed may take any suitable form, e.g. a server unit, a desktop computer, a laptop computer, a tablet, a smart phone, or a wearable device such as a smart watch or smart glasses, etc.

For instance in embodiments the computer system 2 may take the form of an individual user terminal such as a desktop, laptop, tablet, smart phone or wearable device; or a plurality of user terminals networked together via a local wired or wireless network (e.g. home network or company intranet), such as an Ethernet, Wi-Fi network, Bluetooth network, 6LowPAN network, ZigBee network, optical network, etc. In other embodiments the computer system 2 may take the form of a server unit, or a plurality of server units in the same rack or data centre networked together via a server fabric. In further embodiments, the computer system 2 may comprise one or more user terminals networked together with one or more server units via a local network (e.g. home network or company intranet), or a wide area network such as a cellular network, or a wide area internetwork such as the Internet, etc.

The computer system 2 comprises processing apparatus 3, comprising one or more processors. Any such processor may comprise, for example, a CPU (central processing unit), or an application specific processor or accelerator processor such as a GPU (graphics processing unit), DSP (digital signal processor), an AI accelerator processor or a cryptoprocessor, etc. The computer system also comprises memory 5 operably coupled to the processing apparatus 3 to allow the processor to fetch and run code (software) from the memory 3 and to load and store data from/to the memory 3. The memory 5 comprises one or more memory devices employing one or more volatile and/or non-volatile storage media. Any such memory device may for example comprise an electronic memory medium such as a ROM (read only memory), RAM (random access memory), EEPROM (electrically erasable and programmable ROM, e.g. flash memory), WORM (write-once read read-many) memory, or OTP (one-time programmable memory), etc.; or a magnetic medium such as a magnetic disk or tape; or an optical medium such as an optical disk (e.g. CDROM) or quartz glass storage; or even a more exotic forms such as a synthetic biological memory.

Any memory device used as part of the memory 5 may be internal to the same integrated circuit (IC) or IC package, or ICs or IC packages, as the processing apparatus; or the memory device could be external but on the same board or within the same housing of the same computer unit, or could be a peripheral memory device external to the housing of the computer unit. For instance, in embodiments the memory 5 may comprise a ROM, RAM or EEPROM on the same IC (i.e. chip) or board as at least one processor of the processing apparatus 3; or a HDD (hard disk drive), SSD (solid state drive), removable magnetic disk or tape drive, or optical disk drive (e.g. CDROM drive) within the housing of the same computer unit; or an external peripheral HDD, SSD, removable disk drive or optical drive, etc.

The network 4 may represent any one or more networks—either an individual network or a plurality of networks connected via any suitable internetworking means such as Internet Protocol (IP). Any such network could be wired a local area network such as an Ethernet network, or a wireless local area network such as a WI-FI network, Bluetooth network, 6LOWPAN network or ZigBee network, etc.; or a wide area network such as a cellular network (e.g. 3GPP network such as a 2G, 4G or 5G network) or PSTN (public switched telephone network), etc.; or a wide area internetwork such as the Internet. Also in embodiments the term "local" or "local area" does not exclude variants such as personal area network (PAN), body area networks (BAN) or server area network (SAN, also called a server fabric); and the term "wide" or "wide area" does exclude variants such as a metropolitan area network (MAN). The network interface 7 may comprise any one or more network interface devices for connecting to one or more networks. For instance the network interface 7 may comprise a network card, modem, etc., for connecting to any of the network types mentioned previously.

Optionally the computer system 2 may comprise a user interface (UI) 9, though this is not essential in all possible scenarios, e.g. in the case of a server unit or other computer that runs autonomously or is used autonomously by another computer. Where a UI 9 is present, it may take any suitable form for inputting and/or outputting information from/to a user, e.g. a screen, touchscreen, point-and-click interface, keyboard or key pad, or audio interface, etc.

The network endpoint 6 may be any remote or external computer device, software element or network location separate from the computer system 2, at least in that it is separated by the network 4. The endpoint may be identified as a network endpoint by an address within the network 4. The endpoint may comprise for example a server (comprising one or more server units); a user terminal (e.g. desktop, laptop, tablet, phone or wearable, etc.); a site or location within the network, such as a website; or a particular software entity such as a bot or other automated serving program, etc.

FIG. 1B shows the software components involved in the presently disclosed schemes. The software components comprise an operating system (OS) 8 and one or more application processes 10. The OS 8 is stored in at least one memory device of the memory 5 and arranged to run on at least one processor 3 of the processing apparatus. It is configured so as when run to perform the functionality described below. Each application process 10 is a currently running instance of an application stored in the memory 5. The distinction between an application and an application process is that the "application" refers to the persistent code as stored on non-volatile memory such as hard disk (or SSD or such like), that persists even when the application is closed or the computer is turned off, whereas the application "process" refers to a currently-running instance of the application, which is ended when the application is closed down.

It will be appreciated that the memory 5 shown in the figures may represent more than one memory device, and the various software components and any data involved in the presently disclosed techniques need not necessarily all be stored on the same memory device. E.g. the OS 8 may be stored in a ROM, hard disk or SSD, or a combination of ROM and HDD/SSD, and when running portions of it may be held temporarily in RAM or a cache; while the application(s) 10 may be stored in one or more HDD or SSDs or loaded from a removable disk and when running, parts of the application(s) 10 may be held in RAM or cache memory; and data being worked on by the OS 8 and application 10 may be held in RAM, cache and/or registers.

The OS 8 comprises filesystem driver software 17 for servicing file access requests 28 requesting to use the memory 5, and network filter driver software 19 for servicing connection establishment requests 30 requesting to use the network interface 7.

The filesystem driver software 17 comprises one or more filesystem drivers. In the case of multiple memory devices it may comprise a respective one or more filesystem drivers for servicing each memory device, or a given set of one or more drivers may be configured to service multiple memory devices. Either way, the filesystem driver software 17 is configured to receive a file access request 28 from an application process 10 running on the OS 8. Note that in embodiments, this request 28 may be received vicariously via one or more intermediate layers such as a driver manager and/or system call layer, and may be transformed into a different form between the application process 10 and the filesystem driver software 17. The file access request 28 as referred to herein refers to the substance of the message from the application process 10 and not necessarily the exact form in which that message is expressed. The file access request 28 is a request, originating directly or vicariously from the application process 10, requesting to access a file in the filesystem of the memory 5 on behalf of the application process. The filesystem refers to the data structure or method by which files are organized in the memory 5. The file access request 28 may for example comprise a request by the application process 10 to read or modify a file in the filesystem of the memory 5. In response to such a request, the filesystem driver software 17 will determine whether the request is granted or denied, and if granted service the request by accessing the memory 5 according to the protocol or protocols required for accessing the filesystem.

The network filter driver software 19 comprises one or more network filter drivers. In the case of multiple network interface devices it may comprise a respective one or more network filter drivers for servicing each network interface device, or a given set of one or more network filter drivers may be configured to service multiple network interface devices. Either way, the network filter driver software 19 is configured to receive a connection establishment request 30 from an application process 10 running on the OS 8. Note that in embodiments, this request 30 may be received vicariously via one or more intermediate layers such as a driver manager and/or system call layer, and may be transformed into a different form between the application process 10 and the network filter driver software 19. The connection establishment request 30 as referred to herein refers to the substance of the message from the application process 10 and not necessarily the exact form in which that message is expressed. The connection establishment request 30 is a request, originating directly or vicariously from the application process 10, requesting to form a connection with a specified network endpoint 6 on behalf of the application process. A network filter, sometimes also referred to as a "firewall", is a security scheme for monitoring incoming and outgoing network traffic and connection establishment requests and determining whether to block traffic and network establishment requests according to a set of one or more security rules. In response to a network establishment request 30, the network filter driver software 19 will determine whether the request is granted or denied, and if granted service the request by forming a connection with the endpoint 6 via the relevant network 4 and the corresponding network interface device of the network interface 7.

The element 25 shown in FIG. 1A represents shared state information which may be shared via any channel that may be provided for communicating data between the filesystem driver software 17 and the network filter driver software 19, e.g. a shared area of memory or shared register(s) where the sharded state information is stored and accessible to both the filesystem driver software 17 and network filter driver software 19, or a software process for copying information from one piece of driver software to the other, or even a dedicated hardware channel would in principle be possible. The shared state information may comprise state information from the filesystem driver software 17, or from the network filter driver software 19, or from both. This enables a more intelligent approach to determining whether to grant access to files and/or endpoints, whereby rather than making decisions in isolation, a decision as to whether to grant access to a file can be made dependent on what network connections are open or even have been opened in the past, and/or a decision as to whether to allow a connection to an endpoint 6 can be made dependent on what files are currently open or have been opened in the past. In principle the dependency could comprise any one or more rules, according to whatever access policy the developer wishes to implement. However the below describes a particularly beneficial policy in accordance with embodiments disclosed herein.

According to such embodiments, the network filter driver software 19 is provided with a means to determine whether a network endpoint 6 is trusted. This could be any test for demonstrating (not necessarily with 100% certainty) that the endpoint in question is not malicious. E.g. this may comprise authenticating the endpoint 6 using cryptographic means (e.g. authenticating a certificate or signature of the endpoint), and/or checking that an address (e.g. URL) or other identifier of the endpoint 6 is found on a list of trusted endpoints or not found on a list of untrusted endpoints, and/or checking for malicious data fingerprints (e.g. a fingerprint of a known virus or other malware) in data received from the endpoint 6. If the endpoint fails the test, this does not necessarily mean it is malicious, just that it has not been demonstrated that it is not malicious.

Further, the filesystem driver system 17 may be provided with a means for determining whether a file in the filesystem of the memory 5 is sensitive. E.g. a user may designate that a file is sensitive manually via the UI 9 of the computer system 2; or the OS 8 or an application process 10 may automatically designate a file as sensitive according to some predetermined policy (e.g. a policy comprising a rule that certain types of file content or files originating from certain sources are automatically deemed sensitive), or a policy learned using AI techniques. The designation may be added as a tag to the file, or indicated in a look-up table mapping sensitivity status to files, for example. By whatever means implemented, the filesystem driver 17 is configured to be able to read this manual or automated designation.

In embodiments, the shared state 25 may comprise a state of the network filter driver software 19, which may comprise an indication of whether any connections to any untrusted endpoints are currently open (i.e. active), e.g. a count of the currently open connections. Based on this, when the filesystem driver software 17 receives a file access request 28 from an application process 10 requesting access to a particular target file, the filesystem driver software 17 can make the determination as to whether to grant or deny the request according to an access policy comprising the following rule:

a) if the target file is sensitive then the file access request 28 will be granted only on condition that the shared state information 25 indicates no active connections to an untrusted endpoint 6 are currently open.

Alternatively or additionally, the shared state 25 may comprise a state of the filesystem driver system, which may comprise an indication of whether any sensitive files have ever been read or modified by a given application process 10. This state information may be maintained individually for each currently running application process. In such embodiments, when the network filter driver software 19 receives a connection establishment request 30 from an application process 10, requesting to establish a network connection with a target network endpoint 6, then the network filter driver software 19 can make the determination as to whether to grant or deny the request according to an access policy comprising the following rule:

b) if the target endpoint 6 is untrusted, the connection establishment request 30 will be granted only on condition that the shared state 25 indicates that the requesting application 10 process has never read from or written to a sensitive file.

As recognized herein, is particularly desirable to block untrusted connections if the currently-running application process 10 has ever had access to data of a sensitive file, not just if it has one open at the time of the connection establishment request 30. This is because even if a file has since been closed, a copy of some data from the file may still reside in locations such as RAM, cache, or registers to which the requesting process 10 may still have access.

Preferably, but not essentially, both rules a) and b) are implemented by the filesystem driver software 17 and the network filter driver software 19 in the same OS 8.

Note: an "application" refers to the persistent code stored on the hard disk (or SSD or such like) that remains even when the application is closed or the computer is turned off, whereas the application "process" refers to a currently-running instance of the application. The rule b) is that the currently-running application process is not allowed to establish an untrusted connection if it has ever read or edited a sensitive file, but if the application process was shut down and a new process started, or the computer was turned off and on again, then the newly running instance of the application could now open an untrusted connection (as long as it doesn't read or edit a sensitive file again before doing so). The rule is preferably not that the application itself can never establish an untrusted connection ever again even if the application is shut down and restarted or the computer is turned off and on again. Once the currently running instance is closed down, the application does not retain in RAM, cache or registers any persistent state for network or file access for the application.

Figure 1C:
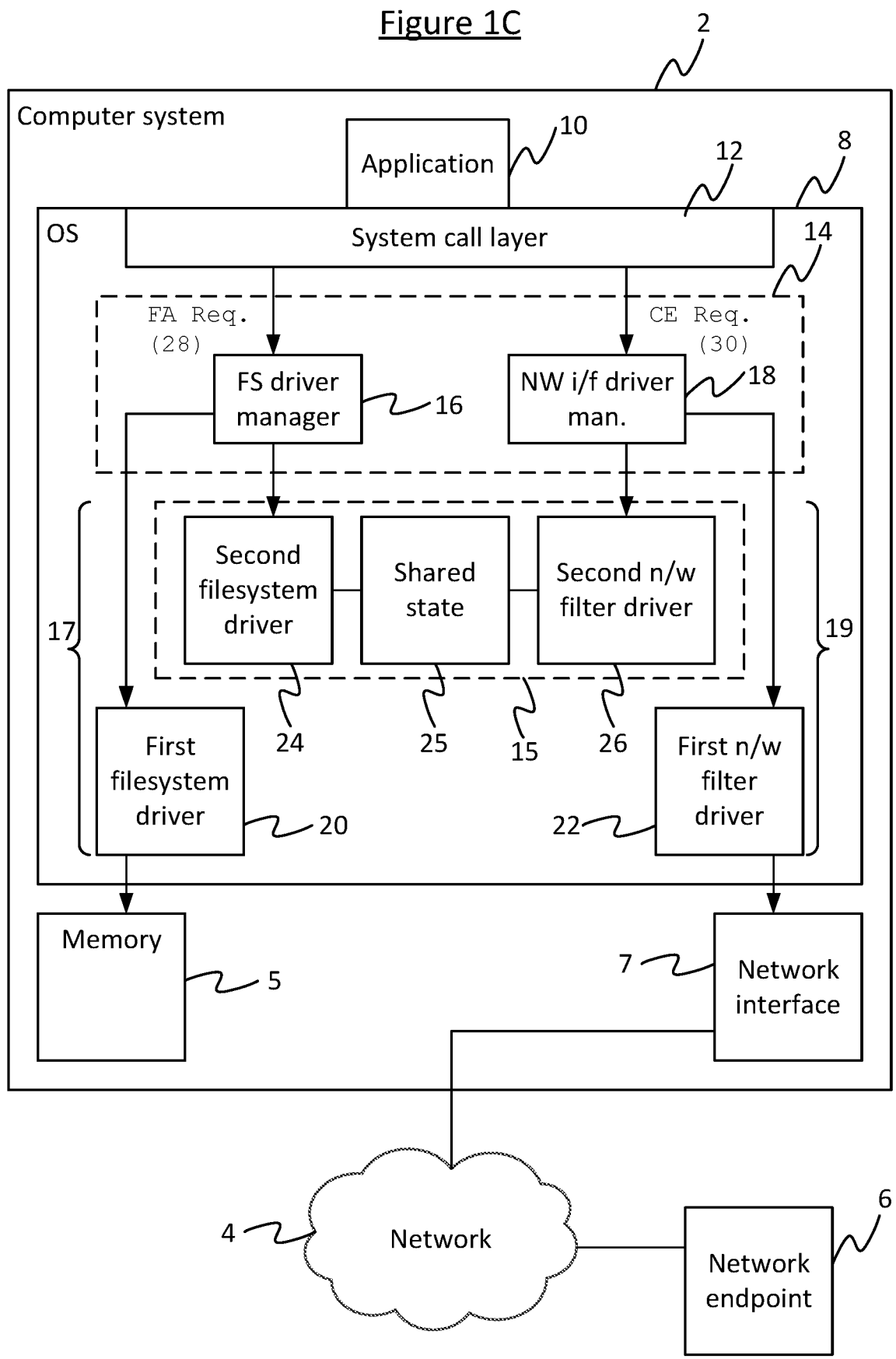
FIG. 1C is a schematic block diagram of a computer system in accordance with embodiments of the present disclosure.

FIG. 1C shows a particular example implementation of the system 2 of FIG. 18. It will be appreciated that this is just one example, and different implementations providing the same functionality in other kinds of OS 8 are possible.

In the implementation of FIG. 1C, the OS 8 comprises a system call layer 12, and driver management software 14 comprising a filesystem driver manager 16 and a network filter driver manager 18. E.g. the filesystem driver manager 16 may comprise a minifilter manager, and the network filter driver manager 18 may comprise a WFP callout engine (WFP=Windows filtering system). The filesystem driver software 17 comprises a first filesystem driver 20 and a second filesystem driver 24. The first filesystem driver 20 implements the basic protocol(s) for accessing the filesystem in memory 5 if a file access request 28 is granted, and may also implement one or more standard rules for checking or blocking access to files, such as based on the identity of the user attempting to access the file or authenticating the user; whilst the second filesystem driver 24 implements the additional file access rules(s) based on the shared state 25 from the network filter driver software 19, e.g. as discussed previously. For instance the first filesystem driver may be a first minifilter which may be a standard part of the OS 8, and the second filesystem driver may be a custom minifilter. The network filter driver software 19 comprises a first network filter driver 22 and a second network filter driver 26. The first network filter driver 22 implements the standard firewall protocol(s) for checking or blocking connections with endpoints 6 over the network (s), such as based on the identify of the endpoint itself or authenticating the endpoint, or monitoring traffic to/from the endpoint; whilst the second network filter driver 26 implements the additional network connection rule(s) based on the state information 25 from the filesystem driver software 17, e.g. as discussed previously. E.g. the first network filter driver 22 may comprise a first WFP callout which may be a standard part of the OS 8, and the second network filter driver 26 may be a custom WFP callout.

In operation, the application process 10 submits each of the file access requests 28 and connection establishment requests 30 in the form of a system call to the system call layer 12 of the OS 8. The system call layer 12 routes the request to the filesystem driver manager 16 if it is a file access request 28 or to the network filter driver manager 18 if it is a connection establishment request 30. Each of the filesystem drivers 20, 24 subscribes to network access requests from the filesystem driver manager 16, which will forward any requests 28 relevant to these filesystem drivers 20, 24 on to those drivers (the request 28 may be forwarded in transformed form). Similarly each of the network filter drivers 22, 26 subscribes to connection establishment requests from the network filter driver manager 18, which will forward any requests relevant to those drivers 22, 26. In embodiments each filesystem driver (e.g. minifilter) 20, 24 creates a respective driver invocation (e.g. minifilter invocation) per file for which it receives any request 28, and subscribes to request on a per file basis. Similarly each network filter driver 22, 26 (e.g. WFP callout) may create a respective driver invocation (e.g. WFP callout invokation) per network endpoint for which it receives any request 30, and subscribes to requests on a per endpoint basis. Regarding the minifilter and network filter flows, in the case of filesystem filters 20, 24, these can work together to grant or deny access to files since both file filters use the same framework. In case of network filters 22, 26, the WFP Callouts (which may also be referred to as filters) mark the connection to be either blocked or allowed and return the connection to the WFP engine 18. The engine will transfer the handling of the network connections (if required) to the relevant network driver.

In an implementation as shown in FIG. 1C—whereby the filesystem driver software 17 comprises a first, standard filesystem driver 20 and a second, custom filesystem driver 24, and the network filter driver software 19 comprises a first, standard network filter driver 22 and second, custom network filter driver 26—this advantageously allows the disclosed functionality to be added in a modular fashion on top of the existing drivers of a legacy operating system. However, it will be appreciated that this implementation is not essential and in alternative embodiments, the described functionality of the filesystem driver software 17 can be implemented using a single, combined filesystem driver incorporating both the existing and the new filesystem driver functionality; and/or similarly, the described functionality of the network filter driver software 19 can be implemented using a single, combined network filter driver incorporating both the existing and the new network filter driver functionality.

Figure 2:
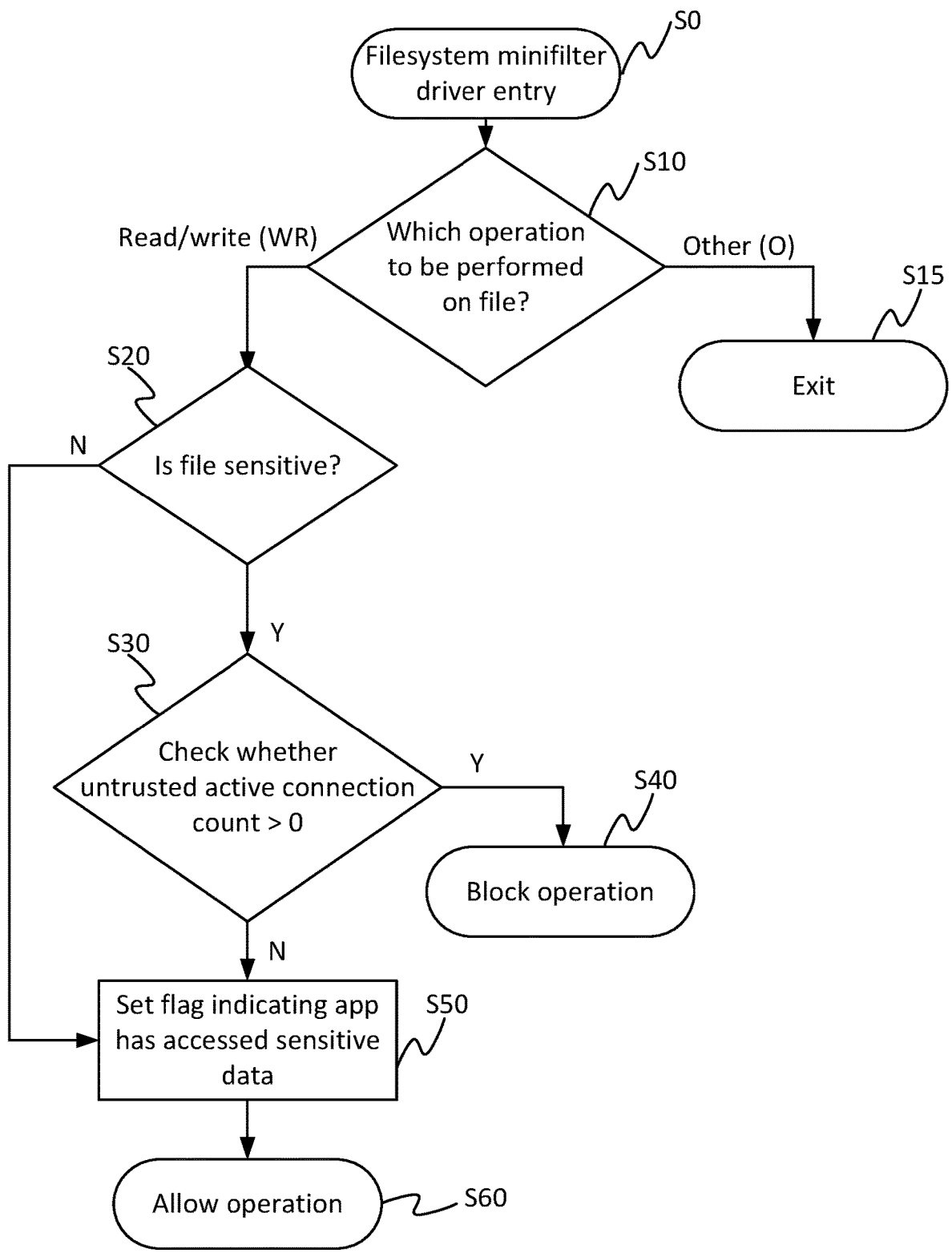
FIG. 2 is a schematic flow chart of a method that may be performed by filesystem driver software in accordance with embodiments disclosed herein.

FIG. 2 shows a method that may be implemented by the filesystem driver software 17, e.g. by the custom minifilter 24, when it receives a file access request 28 requesting to access a target file. At step S0 the method begins. At step S10 the method determines what type of operation is being requested. If it is an operation other than read or write, the method branches to step S15 where it ends. But if the requested operation is a read or write, the method branches to step S20 where it determines whether the target file is sensitive. If not the method branches to step S60 where it ends. But if so, the method proceeds to step S30 where it checks the shared state 25 to determine whether the untrusted active connection count is greater than zero. If so the method branches to step S40 where the requested access to the target file is blocked. But if the untrusted active connection count is zero, the method proceeds to step S50 where access is allowed and a flag is set in the shared state 25 indicating that the requesting application process 10 has accessed sensitive data. The method then proceeds to step S60 where it ends.

FIG. 3 shows a method that may be implemented by the network filter driver software 19, e.g. by the custom WFP callout 26, when it receives a connection establishment request 30 requesting to form a connection with a target endpoint 6. At step T0 the method begins. At step T10 the method determines whether the request is to open a new connection nor close an existing connection. If the letter, the method branches to step T15 where it determines whether the target endpoint 6 is trusted. If so, the method branches to step T35 where it ends. But if not, the method proceeds to step T25 where the count of active untrusted connections is decremented in the shared state 25. The method then proceeds on to step T35 where it ends.

If on the other hand the request 30 is a request to establish a new connection, the method branches from step T10 to step T20 where it determines whether the target endpoint 6 can be trusted. If so the method branches to step T60 where the connection is allowed. But if not the method proceeds to step T30 where it is determined whether the requesting application process 10 has ever read or modified a sensitive file. If so, the method branches to step T40 where the requested connection is blocked (not established). But if so, the method proceeds to step T50 where the count of active untrusted connections is incremented in the shared state 25. The method then proceeds to step T60 where it ends.

In some examples, computer executable instructions are provided using any computer-readable media that are accessible by the computer system 2. Computer-readable media include, for example, computer storage media such as memory and communications media. Computer storage media include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 5) is shown within the computer system 2, it will be appreciated by a person skilled in the art, that, in some examples, the storage is distributed or located remotely and accessed via a network or other communication link (e.g., using a communication interface).

It will be appreciated that the above embodiments have been disclosed by way of example only. More generally there may be provided a system according to any of the following statements.

Statement 1: a computer system comprising: processing apparatus comprising at least one processor, memory comprising at least one memory device, and a network interface comprising at least one interface device; the memory storing operating system software arranged to run on the processing apparatus, the operating system software comprising filesystem driver software and network filter driver software; the filesystem driver software being configured to receive a file access request indicating that an application process running on the processing apparatus is requesting to access a target file in a filesystem of the memory of the computer system; the network filter driver software being configured to receive a connection establishment request indicating that the application process running on the processing apparatus is requesting to establish a connection over a network with a target endpoint via the network interface of the computer system; and one or both of: a) the filesystem driver software being configured to grant or deny the file access request in dependence on state information from the network filter driver software, or b) the network filter driver software being configured to grant or deny the connection establishment request in dependence on state information from the filesystem driver software.

Statement 2: the computer system of Statement 1, wherein at least a) the filesystem driver software is configured to grant or deny the request to access the target file in dependence on the state information from the network filter driver.

Statement 3: the computer system of Statement 2, wherein the filesystem driver software is configured to determine whether the target file is sensitive, and the state information from the network filter driver software comprises an indication of whether any untrusted network connections are currently active via the network interface, the file system software being configured to perform a) according to a rule that if the target file is sensitive then the file access request will be granted on condition that the state information from the network filter driver software indicates no active connections to an untrusted endpoint.

Statement 4: the computer system of Statement 1, wherein at least b) the network filter driver software is configured to grant or deny the connection establishment request in dependence on the state information from the filesystem driver.

Statement 5: the computer system of Statement 4, wherein the network filter driver software is configured to determine whether the target endpoint is trusted, and the state information from the filesystem driver software comprises an indication of whether the application process has ever read from or written to a sensitive file, the network filter driver software being configured to perform b) according to a rule that if the target connection is untrusted, the connection establishment request will be granted only on condition that the state information from the filesystem driver software indicates that the application process has never read from or written to a sensitive file, but otherwise the file access request will be denied.

Statement 6: the computer system of any preceding Statement, wherein both a) and b).

Statement 7: the computer system of Statement 6, wherein: the filesystem driver software is configured to determine whether the target file is sensitive, and the state information from the network filter driver software comprises an indication of whether any untrusted network connections are currently active via the network interface, the file system software being configured to perform a) according to a rule that if the target file is sensitive then the file access request will be granted only on condition that the state information from the network filter driver software indicates no active connections to an untrusted endpoint; and the network filter driver software is configured to determine whether the target endpoint is trusted, and the state information from the file system driver software comprises an indication of whether the application process has ever read from or written to a sensitive file, the network filter driver software being configured to perform b) according to a rule that if the target connection is untrusted, the connection establishment request will be granted only on condition that the state information from the filesystem driver software indicates that the application process has never read from or written to a sensitive file, but otherwise the connection establishment request will be denied.

Statement 8: the computer system of any preceding Statement, wherein: the operating system comprises a filesystem driver manager configured to receive the file access request from the application process via a system call layer of the operating system, and each of one or more filesystem drivers comprised by the filesystem driver software is configured to receive the file access request by subscribing to have file access requests for the target file forwarded from the filesystem driver manager; and the operating system comprises a network filter driver manager configured to receive the connection establishment request from the application process via the system call layer, and each of one or more network filter drivers comprised by the network filter driver software is configured to receive the connection establishment request by subscribing to have connection establishment requests for the target endpoint forwarded from the network filter driver manager.

Statement 9: the computer system of Statement 8, wherein: the one or more filesystem drivers comprises a first filesystem driver and a second filesystem driver, the second filesystem driver being configured to perform the granting or denying of the file access request, and the first file system driver being configured to access the memory and thereby execute the file access request when granted; and the one or more network filter drivers comprise a first network filter driver and a second network filter driver, the second network filter driver being configured to perform the granting or denying of the connection establishment request in dependence on the state information from the filesystem driver software, and the first network filter driver being configured to implement one or more other network filter rules for granting or denying the connection establishment request or blocking an existing connection based on information other than a state of the filesystem driver software.

Statement 10: the computer system of Statement 9, wherein the first filesystem driver comprises a first minifilter, the second filesystem driver comprises a second minifilter, the filesystem driver manager comprises a minifilter manager, the first network filter driver comprises a first WFP callout driver, the second network filter driver comprises a second WFP callout driver, and the network filter driver manager comprises a WFP engine.

Statement 11: the computer system of any of Statements 1 to 8, wherein one or both of: the filesystem driver software comprises a single integrated filesystem driver configured to perform the granting or denying of the file access request and access the memory and thereby execute access request when granted; or the network interface driver software comprises a single integrated network filter driver configured to perform the granting or denying of the connection establishment request based on the state information from the filesystem software, and to implement one or more other network filter rules for granting or denying the connection establishment request or blocking an existing connection based on information other than a state of the filesystem driver software.

According to another aspect disclosed herein, there is provided a method of operating a computer system comprising the operations of the filesystem driver software and/or network filter driver software of any preceding Statement.

According to another aspect disclosed herein, there is provided a computer program embodied on computer-readable storage, the computer program comprising an operating system comprising the filesystem driver software and network filter driver software of any preceding Statement.

Other variants or use cases may become apparent to a person skilled in the art once given the disclosure herein. The scope of the present disclosure is not limited by the above-described embodiments, but only by the accompanying claims.

The invention claimed is:

1. A computer system comprising:
a processing apparatus comprising a processor,
memory comprising a memory device, and
a network interface comprising a network interface device;
the memory storing operating system software arranged to execute on the processing apparatus, the operating system software comprising instructions operative upon execution by the processing apparatus to:
receive, by filesystem driver software of the operating system software, a file access request indicating that an application process running on the processing apparatus is requesting access to a target file in a filesystem of the memory of the computer system;
receive, by the network filter driver software of the operating system software, a connection establishment request indicating that the application process running on the processing apparatus is requesting to establish a connection over a network with a target endpoint via the network interface of the computer system;
via a communication channel for sharing state between the filesystem driver software and the network filter driver software, accessing, by the filesystem driver software, network filter driver software state information; and
by the filesystem driver software, grant or deny the file access request in dependence on the network filter driver software state information.

2. The computer system of claim 1, wherein the network filter driver software state information comprises an indication of whether there is any active network connection with an untrusted endpoint and the instructions are further operative, upon execution by the processing apparatus, to, by the filesystem driver software, determine whether the target file is designated as sensitive, wherein the granting or denying of the file access request is based on the network filter driver software state information according to a rule that: if the target file is designated as sensitive then the file access request will be denied unless the network filter driver software state information indicates no active connections to any untrusted endpoint.

3. The computer system of claim 1, wherein the instructions are further operative upon execution by the processing apparatus to:
    via the communication channel for sharing state between the filesystem driver software and the network filter driver software, accessing, by the network filter driver software, filesystem driver software state information; and
    by the network filter driver software, grant or deny the connection establishment request in dependence on the filesystem driver software state information.

4. The computer system of claim 3, wherein the filesystem driver software state information comprises an indication of whether the application process has ever read from or written to a file designated as sensitive and the instructions are further operative, upon execution by the processing apparatus, to, by the network filter driver software, determine whether the target endpoint is trusted and the network filter driver software is operative to perform the granting or denying of the connection establishment request based on the filesystem driver software state information according to a rule that: if the target endpoint is untrusted, the connection establishment request will be granted only on condition that the filesystem driver software state information indicates that the application process has never read from or written to any sensitive file, but otherwise the file access request will be denied.

5. The computer system of claim 1, wherein the network filter driver software state information includes an indication of whether there is any active network connections with an untrusted endpoint, the filesystem driver software denying the file access request upon the network filter driver software state information indicating that an active network connection with any untrusted endpoint exists.

6. The computer system of claim 1, wherein:
    the network filter driver software receives filesystem driver software state information from the filesystem driver software via the communication channel;
    the filesystem driver software state information comprises an indication of whether the application process has ever read from or written to any sensitive file; and
    the network filter driver software denies the connection establishment request unless the target endpoint is trusted or the filesystem driver software state information indicates that the application process has never read from or written to any sensitive file.

7. The computer system of claim 1, wherein:
    the operating system software comprises a filesystem driver manager operative upon execution by the processing apparatus to receive the file access request from the application process via a system call layer of the operating system software, and each of one or more filesystem drivers comprised by the filesystem driver software is operative upon execution by the processing apparatus to receive the file access request by subscribing to have file access requests for the target file forwarded from the filesystem driver manager; and
    the operating system software comprises a network filter driver manager operative upon execution by the processing apparatus to receive the connection establishment request from the application process via the system call layer, and each of one or more network filter drivers comprised by the network filter driver software is operative upon execution by the processing apparatus to receive the connection establishment request by subscribing to have connection establishment requests for the target endpoint forwarded from the network filter driver manager.

8. The computer system of claim 7, wherein:
    the one or more filesystem drivers comprises a first filesystem driver and a second filesystem driver, the second filesystem driver being operative upon execution by the processing apparatus to perform the granting or denying of the file access request, and the first filesystem driver being operative upon execution by the processing apparatus to access the memory and thereby execute the file access request when granted;
    the one or more network filter drivers comprise a first network filter driver and a second network filter driver, the second network filter driver being operative upon execution by the processing apparatus to perform the granting or denying of the connection establishment request, and the first network filter driver being operative upon execution by the processing apparatus to implement one or more other network filter rules for granting or denying the connection establishment request or blocking an existing connection based on information other than a state of the filesystem driver software; and
    the communication channel is established between the second filesystem driver and the second network filter driver.

9. The computer system of claim 8, wherein the first filesystem driver comprises a first minifilter, the second filesystem driver comprises a second minifilter, the filesystem driver manager comprises a minifilter manager, the first network filter driver comprises a first operating system filtering platform callout driver, the second network filter driver comprises a second operating system filtering platform callout driver, and the network filter driver manager comprises an operating system filtering platform engine.

10. The computer system of claim 1, wherein the network filter driver software comprises a single integrated network filter driver operative upon execution by the processing apparatus to perform the granting or denying of the connection establishment request based on filesystem driver software state information received by the network filter driver software via the communication channel, and to implement one or more other network filter rules for granting or denying the connection establishment request or blocking an existing connection based on information other than a state of the filesystem driver software.

11. A method of operating a computer system comprising a processing apparatus that includes at least one processor, memory, and a network interface, the method comprising:
    receiving, by filesystem driver software of an operating system software, a file access request indicating that an application process running on the processing apparatus is requesting to access a target file in a filesystem of the memory of the computer system;
    receiving, by network filter driver software of the operating system software, a connection establishment request indicating that the application process running on the processing apparatus is requesting establishment of a connection over a network with a target endpoint via the network interface of the computer system;
    via a communication channel for sharing state between the filesystem driver software and the network filter driver software, accessing, by the network filter driver software, filesystem driver software state information; and by the network filter driver software, granting or denying the connection establishment request in dependence on the filesystem driver software state information.

12. The method of claim 11, further comprising, by the network filter driver software, determining whether the target endpoint is trusted, wherein;
the filesystem driver software state information comprises an indication of whether the application process has ever read from or written to any file designated as sensitive; and
the granting or denying of the connection establishment request is based on the filesystem driver software state information according to a rule that: if the target endpoint is untrusted, the connection establishment request will be denied unless the filesystem driver software state information indicates that the application process has never read from or written to any sensitive file.

13. The method of claim 11, further comprising:
via the communication channel for sharing state between the filesystem driver software and the network filter driver software, accessing, by the filesystem driver software, network filter driver software state information; and
by the filesystem driver software, determining whether to grant or deny the file access request in dependence on the network filter driver software state information.

14. The method of claim 13, wherein the network filter driver software state information comprises an indication of whether any untrusted network connections are currently active via the network interface, the method further comprising determining, by the filesystem driver software, whether the target file is designated as sensitive, wherein the granting or denying of the file access request by the filesystem driver software is based on the network filter driver software state information according to a rule that: if the target file is designated as sensitive then the file access request will be denied unless the network filter driver software state information indicates no active connections to any untrusted endpoint exist.

15. The method of claim 11, wherein the filesystem driver software state information includes an indication of whether the application process has ever read from or written to any file designated as sensitive, the network filter driver software denying the connection establishment request upon the filesystem driver software state information indicating that the application process has ever read from or written to any file designated as sensitive.

16. The method of claim 11, wherein:
the filesystem driver software receives network filter driver software state information from the network filter driver software via the communication channel;
the network filter driver software state information comprises an indication of whether any untrusted network connections are currently active via the network interface; and
the filesystem driver software denies the file access request unless the target file is not designated as sensitive or the network filter driver software state information indicates no active connections to any untrusted endpoint exists.

17. An operating system software for a computer system embodied on non-transitory computer-readable storage, the operating system software comprising filesystem driver software and network filter driver software, the computer operating system software being operative upon execution to:

receive, by the filesystem driver software of the operating system software, a file access request indicating that an application process running on the computer system is requesting to access a target file in a filesystem of a memory of the computer system;
receive, by the filesystem driver software and via a communication channel for sharing state between the filesystem driver software and the network filter driver software, network filter driver software state information from the network filter driver software;
receive, by the network filter driver software of the operating system software, a connection establishment request indicating that the application process running on the computer system is requesting to establish a connection over a network with a target endpoint via a network interface of the computer system;
receive, by the network filter driver software and via the communication channel, filesystem driver software state information from the filesystem software driver;
by the filesystem driver software, grant or deny the file access request in dependence on the network filter driver software state information; and
by the network filter driver software, grant or deny the connection establishment request in dependence on the filesystem driver software state information.

18. The operating system software of claim 17, wherein the filesystem driver software is operative upon execution to determine whether the target file is designated as sensitive, and the network filter driver software state information comprises an indication of whether any untrusted network connections are currently active via the network interface, the filesystem driver software being operative to grant or deny the file access request according to a rule that if the target file is designated as sensitive then the file access request will be granted on condition that the network filter driver software state information indicates that no active connections to an untrusted endpoint exist.

19. The operating system software of claim 17, wherein the network filter driver software is operative upon execution to determine whether the target endpoint is trusted, and the filesystem driver software state information comprises an indication of whether the application process has ever read from or written to any sensitive file, the network filter driver software being operative to grant or deny the connection establishment request according to a rule that if the target endpoint is untrusted, the connection establishment request will be denied unless the filesystem driver software state information indicates that the application process has never read from or written to any file designated as sensitive.

20. The operating system software of claim 17, wherein:
the filesystem driver software is operative upon execution to determine whether the target file is designated as sensitive, and the network filter driver software state information comprises an indication of whether any untrusted network connections are currently active via the network interface, the filesystem driver software being operative to grant or deny the file access request according to a rule that if the target file is designated as sensitive then the file access request will be granted on condition that the network filter driver software state information indicates that no active connections to an untrusted endpoint exist; and
the network filter driver software is operative upon execution to determine whether the target endpoint is trusted, and the filesystem driver software state information comprises an indication of whether the application process has ever read from or written to any sensitive file, the network filter driver software being operative to grant or deny the connection establishment request according to a rule that if the target endpoint is untrusted, the connection establishment request will be granted only on condition that the filesystem driver software state information indicates that the application process has never read from or written to any file designated as sensitive, but otherwise the file access request will be denied.

* * * * *